(12) United States Patent
Cheung et al.

(10) Patent No.: US 8,382,627 B2
(45) Date of Patent: Feb. 26, 2013

(54) MULTIPLE DRIVE SYSTEM FOR FOOD PROCESSOR AND MIXER

(75) Inventors: Shu Wan Cheung, Quarry Bay (HK); Chi Yin Chung, Quarry Bay (HK); Wang Kei Kong, Quarry Bay (HK)

(73) Assignee: Huiyang Allan Plastic & Electric Industries Co., Limited, Guangdong (CN)

( * ) Notice: Subject to any disclaimer, the term of this patent is extended or adjusted under 35 U.S.C. 154(b) by 323 days.

(21) Appl. No.: 12/954,590

(22) Filed: Nov. 24, 2010

(65) Prior Publication Data
US 2012/0129643 A1 May 24, 2012

(51) Int. Cl.
F16H 48/30 (2012.01)
F16H 37/06 (2006.01)
(52) U.S. Cl. ........................................ 475/150; 475/332
(58) Field of Classification Search .................. 475/150, 475/332
See application file for complete search history.

(56) References Cited

U.S. PATENT DOCUMENTS

| 5,556,355 A * | 9/1996 | Ostrowski ...................... 475/332 |
| 2003/0203782 A1 * | 10/2003 | Casey et al. .................... 475/150 |
| 2006/0046887 A1 * | 3/2006 | Bennett ......................... 475/150 |

* cited by examiner

Primary Examiner — Edwin A Young
(74) Attorney, Agent, or Firm — Intellectual Property Law Group LLP

(57) ABSTRACT

A multiple drive system of a food processor/mixer, comprising first, second and third drive outlets, each operable at different speeds. This system is incorporated with a planetary gear system. A motor with shaft, coupled to the first drive outlet, drives it at a selected speed. The shaft coupled with a first sun gear meshed in a ring gear drives a first set of planet gears. The second drive outlet, mounted on the arm of the first set of planet gears, drives at a different speed, and is coupled with a second sun gear meshed in the ring gear and drives a second set of planet gears. The third drive outlet, mounted on the arm of the second set of planet gears, drives at another different speed. The second and third drive outlets are driven at different speeds according to gear-ratio of the planetary gear system, without changing the input voltage.

18 Claims, 3 Drawing Sheets

MULTIPLE DRIVE SYSTEM FOR FOOD PROCESSOR AND MIXER

BACKGROUND OF THE INVENTION

1. Field of Invention

The present invention relates to a food processor and mixer. In particular, the invention relates to a multiple drive system for a food processor and/or mixer which improves reliable processing for various types and hardness of foods.

2. Background

Different types of foods are best processed at different speeds. Many food processors have a speed control device, where the motor is driven at a different speed by changing voltage or by other electronic means. However, these systems can be less reliable and susceptible to speed and torque fluctuations. Therefore, such processors can often only process softer foods and thereby the overall performance and versatility for processing other types of foods such as harder, textured and raw foods are compromised.

Accordingly, there is a need for a multiple drive system for a food processor/mixer which can maintain an adequate speed and torque to improve the processing of various types of foods.

SUMMARY OF THE INVENTION

It is an object of the invention to provide a food processor with a multiple drive system which ensures stability in speed and torque.

It is another object of the invention to provide a food processor with a multiple drive system which provides first, second and third drives outlets which are operative at different speeds to process different foods.

It is a further object of the invention to provide a motor shaft which is coupled to the first drive outlet to drive directly at a selected speed.

It is a further object of the invention to provide the second drive outlet and the third drive outlet to be driven at a different speed according to gear ratio of the planetary gear system and without changing the input voltage.

Accordingly, an embodiment of the present invention concerns a food processor with a multiple drive system which comprises a first drive outlet, a second drive outlet and a third drive outlet operating at different speeds; the second and third drive outlets are driven with a planetary gear system at a different speed without changing the input voltage. This multiple drive system is of a simple construction, reliable, stable, high in torque capability, and able to process various foods.

Accordingly, there is provided a planetary gear system of the multiple drive system that includes a sun gear, planet gears and a ring gear. The second drive outlet is mounted on the arm of the first set of planet gears and drives at a different speed. The third drive outlet is mounted on the arm of the third set of planet gears and drives at a different speed.

According to an embodiment of the present invention there is a multiple drive system for a food processor or mixer, the system comprising: a first drive outlet coupled to a central shaft and a motor, the motor drives the first drive outlet at a selected speed; a second drive outlet coupled to a set of components of a planetary gear system and driven by the gear system at a speed different from the first drive outlet; a third drive outlet coupled to a second set of components of the planetary gear system and driven by the gear system at a speed different from the speed of the first drive outlet and different from the speed of the second drive outlet; and a base of the food processor or mixer, upon which the multiple drive system is mounted.

The drive outlets are of a cylinder or round shape, and each of its inner wall comprises a key groove which is connected to the working part.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

Figure 1:
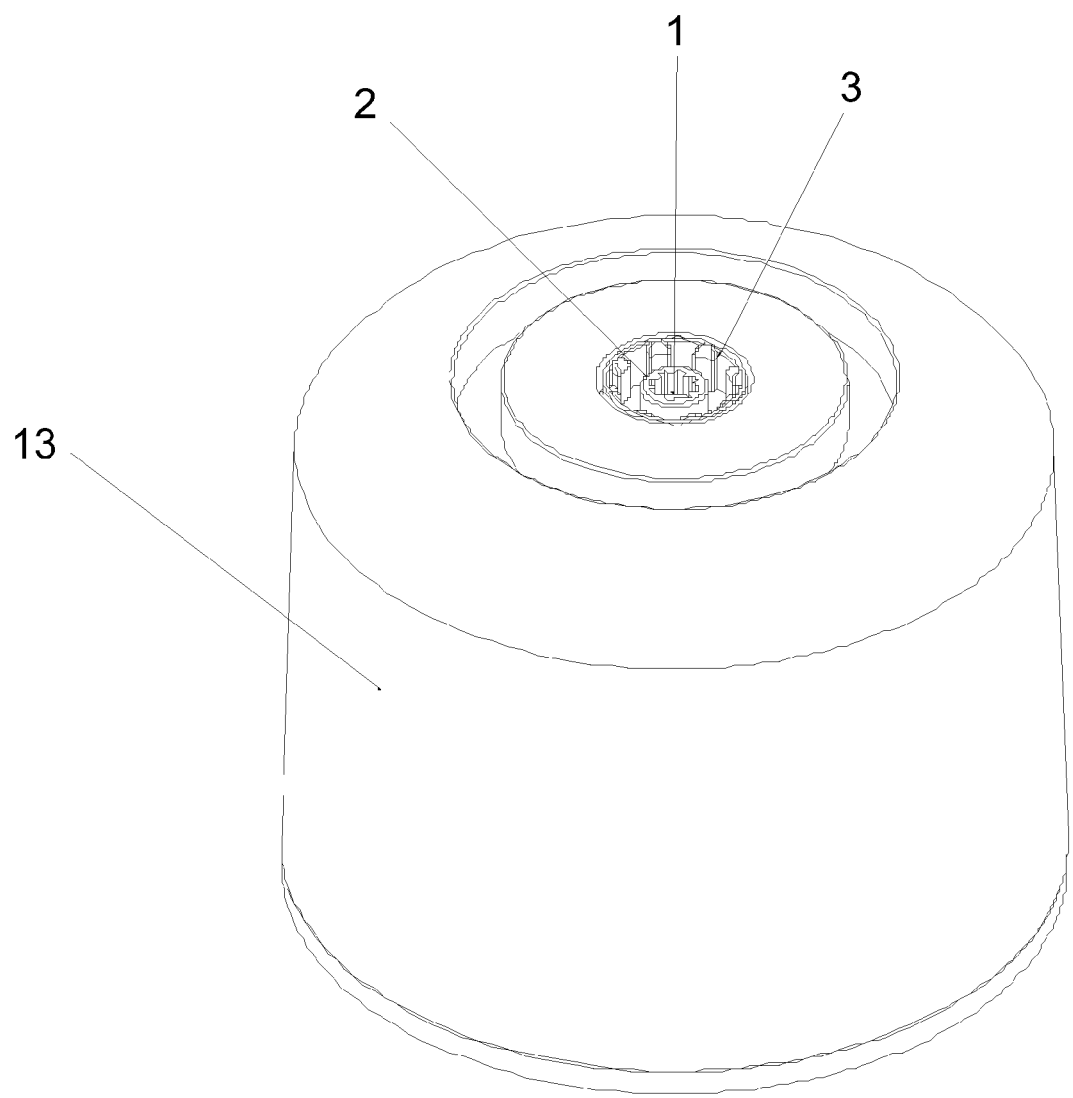
FIG. 1 is perspective view of a base of the multiple drive system for a food processor according to an embodiment of the present invention.
Figure 2:
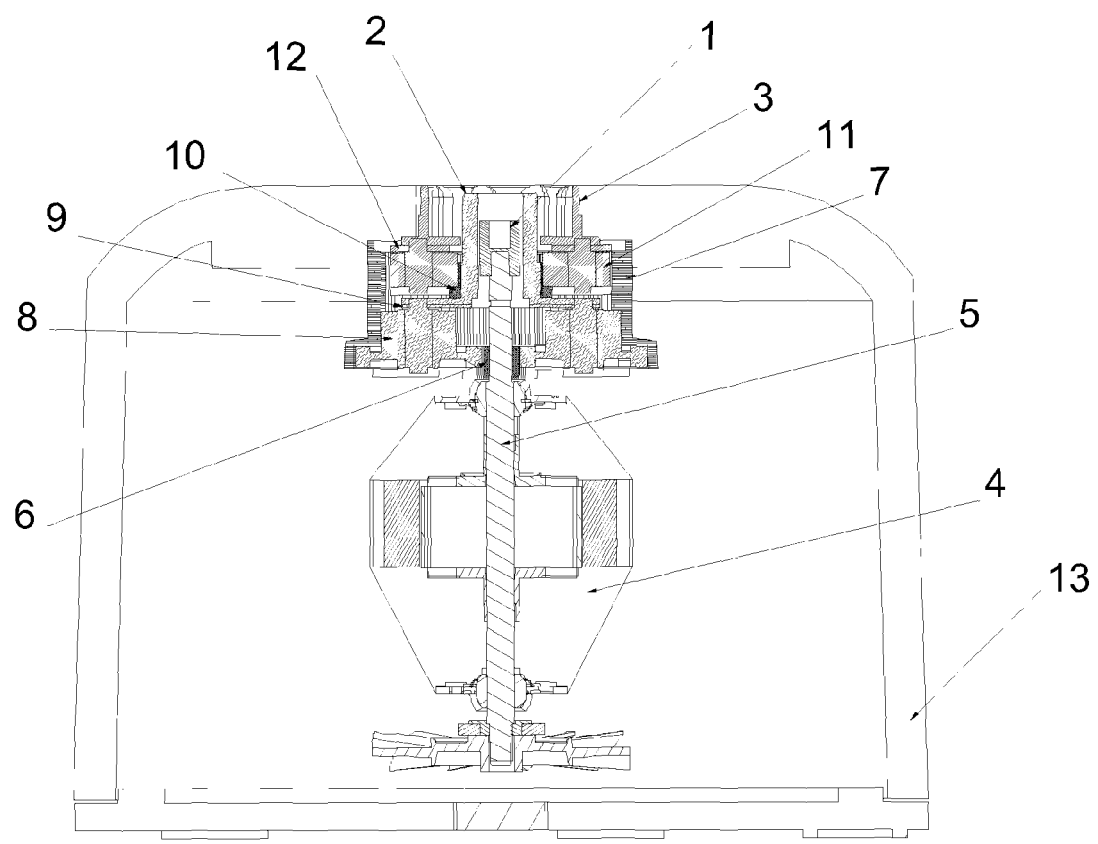
FIG. 2 is a cross-sectional view of the multiple drive system of FIG. 1.
Figure 3:
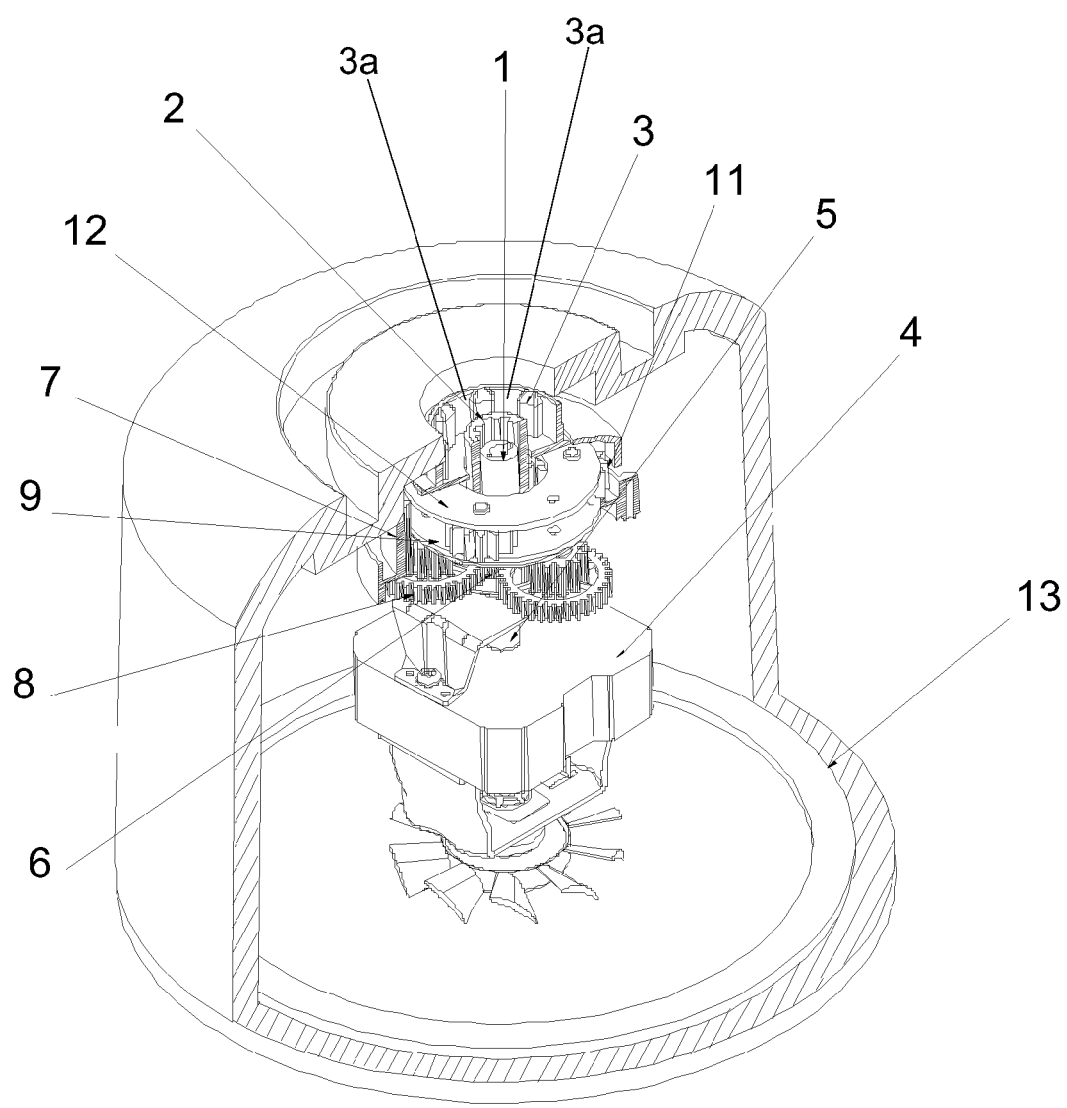
FIG. 3 is a perspective view of the internal components of the multiple drive system, with a cross section through the housing.

Referring to FIG. 1. FIG. 2 and FIG. 3, there is illustrated a food processor and mixer with a multiple drive system comprising a first drive outlet 1, a second drive outlet 2 and a third drive outlet 3, each operating at different speeds. This multiple drive system is incorporated with a planetary gear system. The motor 4 of the system with a shaft 5 is mounted directly to the first drive outlet 1 to drive the first drive outlet 1 at a selected speed. The shaft 5 is coupled with a first sun gear 6 and drives a first set of planet gears 8 revolving around the first sun gear 6 and which run within the ring gear 7.

As shown in FIGS. 2 and 3, the first set of planet gears 8 comprises of two to four gears. The second drive outlet 2 is mounted on the arm 9 of the first set of planet gears 8 which drives the second drive outlet 2 at a different speed. As shown in FIG. 2, the second drive outlet 2 is coupled with a second sun gear 10 and drives a second set of planet gears 11 revolving around the second sun gear 10 and which run inside the ring gear 7. The second set of planet gears 11 comprises of two to four gears. The third drive outlet 3 is mounted on the arm 12 of the second set of planet gears 11 which drives the third drive outlet 3 at a different speed.

The multiple drive system is mounted on the base 13 of the food processor or mixer. Each of the drive outlets are of a cylindrical shape or round shape where the inner wall of each drive outlet includes a key groove 3a which is coupled to the blade or tools of the of the processor. One or more of these grooves 3a are fomed along the inner wall of a respective drive outlet.

The first drive outlet 1 is driven directly by the motor 4. The second drive outlet 2 and the third drive outlet 3 are each driven at a different speed according to the gear ratio of the planetary gear system and without changing the input voltage.

The figures serve to illustrate the invention, and should not be construed as limiting the scope of the invention. It is understood that the present disclosure of the preferred form can be changed in the details of assembly and parts without departing from the spirit and scope of the invention. Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A multiple drive system for a food processor or mixer, the system comprising:
    a first drive outlet coupled to a central shaft and a motor, the motor drives the first drive outlet at a selected speed;
    a second drive outlet coupled to a set of components of a planetary gear system and driven by the gear system at a speed different from the first drive outlet;
    a third drive outlet coupled to a second set of components of the planetary gear system and driven by the gear system at a speed different from the speed of the first drive outlet and different from the speed of the second drive outlet; and
    a base of the food processor or mixer, upon which the multiple drive system is mounted.

2. The multiple drive system for a food processor or mixer according to claim 1, wherein the motor with the central shaft is mounted directly to the first drive outlet to drive the first drive outlet at a selected speed.

3. The multiple drive system for a food processor or mixer according to claim 1, wherein the central shaft is coupled with a first sun gear of the planetary gear system and drives a first set of planet gears which mesh within a ring gear.

4. The multiple drive system for a food processor or mixer according to claim 3, wherein the first set of planet gears comprises of two to four gears, and the second drive outlet is mounted on an arm of the first set of planet gears to be driven at a selected different speed.

5. The multiple drive system for a food processor or mixer according to claim 3, wherein the second drive outlet is mounted on an arm of the first set of planet gears to be driven at a selected different speed, the second drive outlet is coupled with a second sun gear meshed in the ring gear and drives a second set of planet gears.

6. The multiple drive system for a food processor or mixer according to claim 5, wherein the second set of planet gears comprises of two to four gears, and the third drive outlet is mounted on an arm of the second set of planet gears to be driven at a selected different speed.

7. The multiple drive system for a food processor or mixer according to claim 1, wherein each of the drive outlets are a cylindrical shape or round shape, and each drive outlet has an inner wall having a plurality of key grooves, each of which is coupled to a blade of the food processor or mixer.

8. The multiple drive system for a food processor or mixer according to claim 7, wherein the second drive outlet surrounds the first drive outlet and the third drive outlet surrounds the second drive outlet.

9. The multiple drive system for a food processor and mixer according to claim 1, the first drive outlet is driven directly by the motor; and the second drive outlet and the third drive outlet are each driven at a different speed according to a gear ratio of the planetary gear system, without changing an input voltage.

10. A multiple drive system for a food processor and mixer, the system comprising:
    a central shaft and a motor, coupled to a first drive outlet, the motor drives the first drive outlet at a selected speed,
    a planetary gear system comprising a first component having a first sun gear with a first set of planet gears, and a second component having a second sun gear with a second set of planet gears, the second component mounted parallel to and above the first component;
    a second drive outlet surrounding the first drive outlet and coupled with the planetary gear system;
    a third drive outlet surrounding the second drive outlet and coupled with the planetary gear system;
    wherein the gear system drives the second drive outlet and third drive outlet at a different speed from the speed of the first drive outlet according to a gear ratio of the planetary gear system.

11. The multiple drive system according to claim 10, wherein the shaft is coupled with the first sun gear and drives the first set of planet gears.

12. The multiple drive system according to claim 10, wherein the second drive outlet is mounted on an arm of the first set of planet gears and is coupled with the second sun gear.

13. The multiple drive system according to claim 10, wherein the third drive outlet is mounted on an arm of the second set of planet gears.

14. The multiple drive system according to claim 10, further comprising a base upon which the shaft and the motor is mounted.

15. The multiple drive system according to claim 10, wherein the first set of planet gears comprises two to four gears meshed with a ring gear.

16. The multiple drive system according to claim 10, wherein the second set of planet gears comprises two to four gears meshed with a ring gear.

17. The multiple drive system according to claim 10, wherein each of the drive outlets comprise a cylindrical or a round shape.

18. The multiple drive system according to claim 10, wherein each drive outlet has an inner wall having a plurality of key grooves connected to either the first set of planet gears or second set of planet gears.

* * * * *